Jan. 27, 1948.                P. J. WALSH                2,435,062
                           RECTIFIER SYSTEM
                        Filed April 15, 1944

INVENTOR
Philip John Walsh.

Patented Jan. 27, 1948

2,435,062

UNITED STATES PATENT OFFICE 2,435,062

RECTIFIER SYSTEM

Philip John Walsh, San Francisco, Calif., assignor, by direct and mesne assignments, to Agency Electric Co., San Francisco, Calif., a limited partnership Application April 15, 1944, Serial No. 531,260

5 Claims. (Cl. 175—363)

This invention relates to a system for converting alternating current to direct current.

In my application, Serial No. 507,635, for Converter system, filed October 25, 1943, now Patent No. 2,417,622, of March 18, 1947, I describe a system for the conversion of alternating current to direct current by means of saturable core reactors.

It is an object of this invention to improve the system described in my prior application.

It is another object of this invention to increase the time period of power current flow from the source through the load circuit during each half cycle of applied alternating current potential.

It is still another object of this invention to provide a unidirectional inductive impedance for general use as a one-way choke coil.

My invention possesses many other advantages and has other objects which may be made more easily apparent from a consideration of one embodiment of my invention. For this purpose, I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing.

Figure 1:
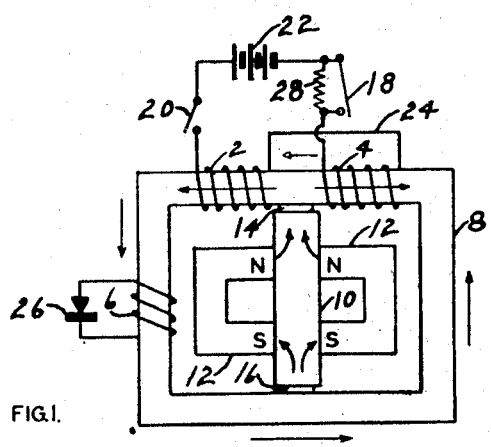
Figures 1 and 2 are drawings for facilitating explanation of the invention.

Referring to Figure 1, the coils 3, 5 and 7 are wound on the laminated closed core of magnetic material 9. The center leg 11 of laminated magnetic material is pressed into position with thin insulating shims 15 and 17 which are equivalent to a small air gap at each end of the leg. To each of two opposed sides of the leg the permanent magnets 13 are attached with like poles facing each other. The relative dimensions of the leg 11 and magnets 13 are such as to normally produce a saturating magnetic field in the leg in the absence of any other factors. Since this part of the invention is described in my prior application referred to above, further detailing thereof is unessential.

Figure 3:
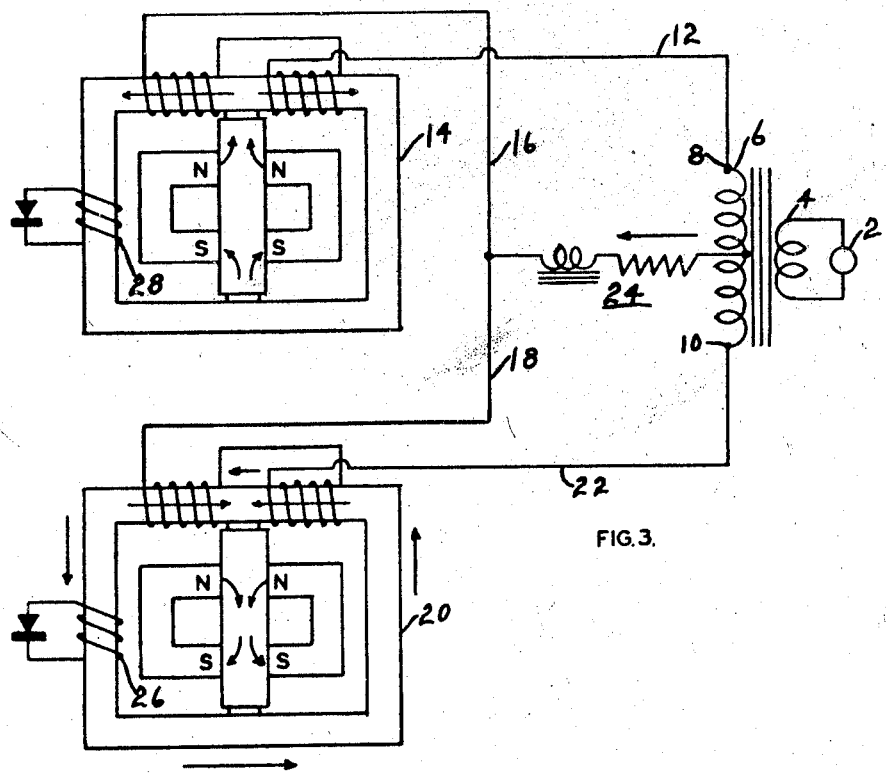
Figure 3 is a drawing showing one form of system embodying the principles of my invention.

In my prior application I show a form of the invention similar to that shown in Figure 3, in which two magnetic type rectifiers are employed to provide a full wave converter system. As the description proceeds I will explain how the coils 26 and 28, which are shunted by small rectifiers, operate to substantially prevent the return of reactive energy to the source and thus extend the time period of load current flow, from the source through the load 24 during each half cycle, over substantially the full half cycle, and how this makes it possible to operate with a substantially pure resistance load.

In Figure 3, the source of alternating current potential 2 is connected to the primary coil 4 of a transformer having the secondary coil 6. The arrows drawn on the cores indicate that, at this instant, magnetizing current is flowing from terminal 8, over conductor 12, through the two coils on the core 14, over conductors 16 and 18, through the two coils on core 20 and thence by way of conductor 22 to terminal 10. Load current flows from the center tap on coil 6 through the load 24, over conductor 18, through the two coils on core 20 and back to terminal 10 by way of conductor 22. The series coils on core 20 are now acting as a low resistance since the permanent magnets practically saturate the center leg in the manner set forth in my prior application.

In the absence of the coils 26 and 28, when the supply voltage across coil 6 passes through zero value, before it can reverse and send current over the circuit in the opposite direction, the energy stored in the core 14 as a magnetic field must be returned to the source. As the flux in the core 14 falls away to zero value an electromotive force is induced in the two series coils which sends current in the same direction over conductors 16 and 18, through the series coils on core 20, over conductor 22 to terminal 10, through coil 6, and then by way of conductor 12 to the other side of the series coils on core 14. The inductive impedance in the load 24 prevents this relatively small impulse of current from flowing in the opposite direction through the load and maintains the flow of load current during this discharge period.

When the voltage across coil 6 reverses its direction, a relatively small magnetizing current flows from terminal 10 through the series coils on core 20, over conductors 18 and 16, through the series coils on core 14 (now acting as a low resistance), and then by way of conductor 12 to terminal 8; while load current flows from the center tap on coil 6, through the load 24, over conductor 16, through the series coils on core 14, in a direction opposite to that indicated by the arrows drawn on the core, and then back to terminal 8 by way of conductor 12.

It is seen that if the reactors did not have to return energy to the source there would be nothing to prevent the flow of load current from the source for a full half cycle.

Figure 2:
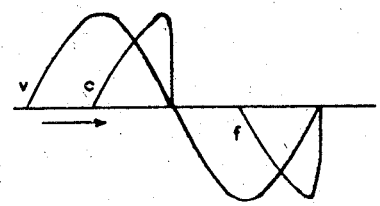

In Figure 2 I show a conventional sine voltage curve v, and current or flux curves c and f. The amplitude of the curves c and f is greatly exaggerated in order to better show the relationship of these curves.

I will now explain how the coils 26 and 28 in Figure 3 operate to shift the direction of the flux in the core so that the magnetic energy is dissipated in the resistance of these coils while load current flows unaffected through the series coils.

Let us assume that the curve v represents the voltage across coil 6 in Figure 3. Time being measured on the sine wave axis in the direction of the arrow. Since the series coils are designed to have a high reactance and low resistance, the current flowing through them lags the voltage by an angle less than ninety time-degrees—the whole cycle takes place in three hundred and sixty time-degrees.

When the voltage across coil 6 builds up as shown by the curve v, magnetizing current begins flowing from terminal 8 through the circuit to terminal 10 less than a quarter wave later. The flux building up in the core 14 in the direction of the arrows induces an electromotive force in the coil 28, but the small rectifier shunted across this coil does not pass current when the voltage is in this direction. When the voltage as indicated by the curve v falls to a value near zero, the current, and the flux produced by it, as indicated by the curve c reaches its maximum value.

As this point is passed, the flux in the core 14 begins to fall away causing induced current to flow in the coil 28 and its shunt rectifier which very greatly retards the collapse of the flux in the left hand half of the core. This unbalanced condition shifts the flux to a path around the core 14 where it can collapse the rest of the way to zero value without inducing any voltage in the series coils, in a manner that will be hereinafter described in connection with Figure 1. During this half cycle, load current flows from the center tap on coil 6 through the load 24 and through the coils on core 20 to terminal 10, and if the load is substantially a resistance, this current is in phase with the applied voltage. The arrows drawn around the outside edge of core 20 indicate that flux remaining from the preceding half cycle is still dying out in the core 20 and inducing current in the coil 26.

When the voltage across coil 6 reverses, as indicated by the lower half of the curve v, load current flows from the center tap on coil 6, through the series coils on core 14 to terminal 8; while magnetizing current will now flow as indicated by the curve f from terminal 10 through the series coils on core 20 in a magnetizing direction, through the series coils on core 14 (now acting as a resistance) to terminal 8. While the flux is building up in the core 20 no current flows in the coil 26. It thus comes about that the magnetic energy stored in the core when the unit is acting as an inductive impedance can be gradually discharged while the unit is acting as a low resistance to allow a large power current to flow. Thus the period of power current flow from the source through the load 24 during each half cycle can be extended over substantially the full half cycle. The rectifier elements shunted across the coils 26 and 28 can be very small low voltage units since the load current does not flow through them.

Referring to Figure 1, let us assume that the switches 19 and 21 are closed, thus allowing current to flow from the battery 23 through the circuit comprising switch 19, coil 5, connection 25, coil 3, switch 21 and back to the battery 23. This current flow through the coils 3 and 5 develops magnetomotive forces which set up magnetic flux in the direction of the solid arrows drawn on the core 9 and leg 11 when the ampere-turns in coil 3 are substantially equal and opposite to those in coil 5. It is obvious that if the ampere-turns in coil 3 were made greater than those in coil 5, part of the flux would shift to a path around the core 9 as indicated by the arrows drawn around the outside edge of the core. As this flux builds up, an electromotive force is induced in the coil 7, but the small rectifier element 27 does not allow current to flow through the coil 7 when the electromotive force is in this direction. Thus during the period of flux build-up in the core 9 the coils 3 and 5 act as an inductive reactance.

After the flux has reached its maximum value, if the switch 19 is opened, thus placing the high resistance 29 in the circuit, the flux in the core 9 will collapse and induce electromotive forces in the coils 3 and 5 which send a small current through these coils in the same direction as the battery current and retard the rate of collapse of the flux. The electromotive force simultaneously induced in the coil 7 now sends a current through the small rectifier element 27 and coil 7 which very greatly retards the collapse of the flux in the left hand half of the core. Thus the flux through the coil 4 collapses at a very much more rapid rate than the flux through the coils 3 and 7. This unbalanced condition causes the direction of the flux in the core 9 to gradually shift to that indicated by the arrows drawn around the outside edge of the core.

At this point the leg 11 is practically saturated by the magnets 13 since the coils are not exerting an equal and opposite effect. The collapsing flux is now in the same direction through the coils 3 and 5 and since these coils are connected in series opposed relation no induced current can flow through them as the flux falls away to zero value. If at this instant, the polarity of the battery 23 could be reversed and the switch 19 closed, the battery current flow through the coils 3 and 5 would have no effect on the collapsing flux in the core 9 since, when the battery current flows in this direction, with the center leg saturated, the coils 3 and 5 buck each other and act substantially as a resistance in the manner set forth in my prior application referred to in column 1. The flux can now continue to fall away to zero value in the core 9 and dissipate all the energy in the resistance of coil 7 and rectifier element 27 while battery current flows through the coils 3 and 5.

The system described is capable of handling relatively heavy power loads which may be purely resistive or highly reactive. That is, the load circuit conditions are very flexible and since power current flows over substantially a full half cycle a greater power output can be obtained from a given amount of copper and magnetic material at a higher efficiency than is possible in my prior system.

From the description of the full wave system illustrated in Figure 3, it will become apparent that half-wave rectification may be realized by leaving out either one of the cores and associated windings etc. from the system.

I claim:

1. In combination, a core of magnetic material forming a substantially closed loop, a pair of windings on said core and adapted to be energized in opposite polarity from a source of alternating current, a leg of magnetic material extending across said loop between said windings to form a pair of magnetic paths, each linking with one of said windings, means for localizing a unidirectional flux in said leg sufficient to substantially saturate the same in the absence of other factors, and means for unbalancing said magnetic paths when the field strength is reduced to shift the flux to a path around said loop.

2. In combination, a core of magnetic material forming a substantially closed loop, a pair of windings on said core and adapted to be energized in opposite polarity from a source of alternating current, a leg of magnetic material extending across said loop between said windings to form a pair of magnetic paths, each linking with one of said windings, means for localizing a unidirectional flux in said leg sufficient to substantially saturate the same in the absence of other factors, and means comprising another winding on said loop and connected to a rectifier for absorbing energy when the field strength is reduced to substantially prevent the flow of induced currents in said pair of windings.

3. In combination, a core of magnetic material forming a substantially closed loop, a pair of windings on said core adapted to be energized in opposite polarity from a source of alternating current, a leg of magnetic material extending across said loop between said windings to form a pair of magnetic paths each linking with one of said windings, means for localizing a unidirectional flux in said leg sufficient to saturate the same in the absence of other factors, and means for withdrawing energy from the alternating magnetic field in said loop during collapses only of such field.

4. A rectifier circuit comprising a core of magnetic material said core including a leg, means for magnetically saturating said leg in the absence of other factors, a winding on said core, a source of alternating current connected across said winding through a load, and means for inducing energy from the alternating magnetic field in said core during collapses only of such field and withdrawing the same from the circuit which includes said source.

5. In combination, a core of magnetic material forming a substantially closed loop, a pair of windings on said core adapted to be energized in opposite polarity from a source of alternating current, a leg of magnetic material extending across said loop between said windings to form a pair of magnetic paths each linking with one of said windings, means for localizing a unidirectional flux in said leg sufficient to saturate the same in the absence of other factors, and means coupled to one of said magnetic paths for withdrawing energy from the alternating magnetic field in said loop during collapses only of such field.

PHILIP JOHN WALSH.

REFERENCES CITED

The following references are of record in the file of this patent:

UNITED STATES PATENTS

| Number | Name | Date |
| --- | --- | --- |
| 1,857,160 | McEachron | May 10, 1932 |
| 1,968,346 | Neiss | July 31, 1934 |
| 2,199,121 | Walsh | Apr. 30, 1940 |
| 2,417,622 | Walsh | Mar. 18, 1947 |

Certificate of Correction

Patent No. 2,435,062. January 27, 1948.

PHILIP JOHN WALSH

It is hereby certified that error appears in the above numbered patent requiring correction as follows: In the drawing Fig. 1 should appear as shown below instead of as in the patent—

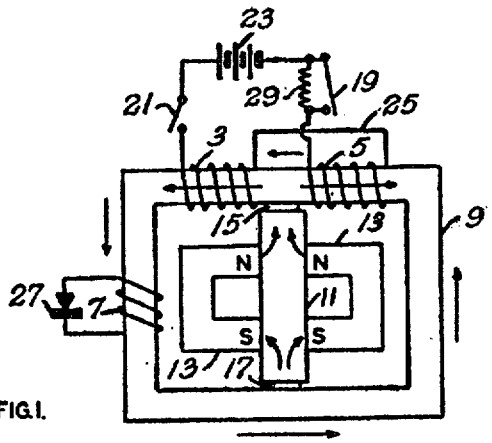

and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*